United States Patent
Monni (10) Patent No.: US 10,574,441 B2
(45) Date of Patent: Feb. 25, 2020

(54) MANAGEMENT OF CRYPTOGRAPHIC KEYS

(71) Applicant: Nokia Technologies Oy, Espoo (FI)

(72) Inventor: Eki Petteri Monni, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 230 days.

(21) Appl. No.: 15/310,848

(22) PCT Filed: May 26, 2014

(86) PCT No.: PCT/FI2014/050410
§ 371 (c)(1),
(2) Date: Nov. 14, 2016

(87) PCT Pub. No.: WO2015/181434
PCT Pub. Date: Dec. 3, 2015

(65) Prior Publication Data
US 2017/0093566 A1    Mar. 30, 2017

(51) Int. Cl.
*H04L 9/08* (2006.01)
*H04L 29/06* (2006.01)
*G06F 21/62* (2013.01)
*H04W 12/00* (2009.01)
(Continued)

(52) U.S. Cl.
CPC ............ *H04L 9/0822* (2013.01); *G06F 21/62* (2013.01); *H04L 9/0866* (2013.01); *H04L 9/0872* (2013.01); *H04L 63/06* (2013.01); *H04W 12/003* (2019.01); *H04W 12/0023* (2019.01); *H04W 12/04* (2013.01);
(Continued)

(58) Field of Classification Search
CPC . H04L 9/0822; H04L 2209/805; H04W 12/04
See application file for complete search history.

(56) References Cited

U.S. PATENT DOCUMENTS 7,079,653 B2    7/2006    Scheidt et al.
7,177,426 B1    2/2007    Dube
8,156,318 B2    4/2012    Johnston
(Continued)

FOREIGN PATENT DOCUMENTS

GB    2447674 A       9/2008
WO    2012161697 A1   11/2012
(Continued)

OTHER PUBLICATIONS

International Search Report and Written Opinion received for corresponding Patent Cooperation Treaty Application No. PCT/FI2014/050410, dated Jan. 16, 2015, 12 pages.
(Continued)

*Primary Examiner* — David Le
(74) *Attorney, Agent, or Firm* — Squire Patton Boggs (US) LLP (57) ABSTRACT

According to an example embodiment of the present invention, there is provided an apparatus (110) comprising a receiver (114) configured to receive at least part of a key in scrambled form, and at least one processing core configured to descramble the at least part of the key and to apply the key in a cryptographic procedure, the descrambling being based at least in part on at least one environmental condition.

17 Claims, 6 Drawing Sheets

Receiving, in an apparatus, at least part of a key in scrambled form — 510

Descrambling the at least part of the key based at least in part on at least one environmental condition — 520

Applying the key in a cryptographic procedure — 530

(51) Int. Cl.
*H04W 12/04* (2009.01)
*H04W 12/02* (2009.01)

(52) U.S. Cl.
CPC . *H04L 2209/805* (2013.01); *H04W 12/00504* (2019.01); *H04W 12/02* (2013.01)

(56) References Cited

U.S. PATENT DOCUMENTS

| | | | |
|---|---|---|---|
| 8,295,490 | B1 | 10/2012 | McCoy et al. |
| 8,621,237 | B1 | 12/2013 | Bailey et al. |
| 2003/0061477 | A1* | 3/2003 | Kahn .............. H04N 7/1675 713/150 |
| 2005/0002532 | A1 | 1/2005 | Zhou et al. |
| 2006/0288238 | A1* | 12/2006 | Ray .................. G06F 21/10 713/193 |
| 2008/0107274 | A1 | 5/2008 | Worthy |
| 2009/0268911 | A1 | 10/2009 | Singh |
| 2010/0262828 | A1 | 10/2010 | Brown et al. |
| 2011/0213978 | A1* | 9/2011 | Fouchard ........... H04L 9/3215 713/171 |
| 2011/0311055 | A1 | 12/2011 | Parann-Nissany |
| 2012/0243687 | A1* | 9/2012 | Li ...................... H04L 9/085 380/277 |
| 2013/0177157 | A1* | 7/2013 | Li ...................... H04L 9/083 380/277 |
| 2015/0131796 | A1* | 5/2015 | Milsted ............. G09C 5/00 380/44 |

FOREIGN PATENT DOCUMENTS

| | | |
|---|---|---|
| WO | 2013072433 A1 | 5/2013 |
| WO | 2013171507 A1 | 11/2013 |

OTHER PUBLICATIONS

Gomez et al., "Overview and Evaluation of Bluetooth Low Energy: An Emerging Low-Power Wireless Technology", Sensors, vol. 12, No. 9, 2012, pp. 11734-11753.

"Bluetooth Low Energy Encryption and Data Safety", Stackoverflow, Retrieved on Jan. 3, 2018, Webpage available at : https://stackoverflow.com/questions/17963954/bluetooth-low-energy-encryption-and-data-safety.

Extended European Search Report received for corresponding European Patent Application No. 14893493.8, dated Dec. 4, 2017, 7 pages.

Chinese Office Action corresponding to Appln. No. 201480079467.8, dated Mar. 4, 2019.

* cited by examiner

MANAGEMENT OF CRYPTOGRAPHIC KEYS

RELATED APPLICATION

This application was originally filed as Patent Cooperation Treaty Application No. PCT/FI2014/050410 filed May 26, 2014.

FIELD OF INVENTION

The present invention relates to managing at least one cryptographic key.

BACKGROUND OF INVENTION

Information may be secured in a number of ways. Information that is confidential in nature may comprise financial, medical, corporate, political or personal information, for example.

Confidential information may be stored in secure premises, preventing accidental or malicious access to the information by placing it in a locked place, such as for example in a safe in an office. Corporate locations may be further, or alternatively, provided with alarm systems, guards, fences and/or other access control functions.

Confidential information may be stored in computers that are not connected to any unsecure networks, to prevent unauthorized network intrusion therein to obtain the information. Such computers may be referred to as "air walled" computers as they have no connection to unsecure networks.

One way to prevent unauthorized access to confidential information is encryption, wherein a plaintext, for example a text in a natural language, such as French, is converted to a ciphertext using an encryption algorithm and a key. Encryption algorithms are designed to render it very difficult to obtain the plaintext from the ciphertext without the key. In general, ciphertext may be known as encrypted information.

An attacker can obtain access to the plaintext of a ciphertext if he succeeds in obtaining both the ciphertext and the key, however. Managing encryption keys needs therefore to be done with care in order to obtain the benefits of encryption. One solution to key management is distributing encryption keys by hand using trusted persons. Once both ends of an unsecure connection then have secure copies of the keys, they can communicate ciphertexts over an unsecure channel to exchange information. For data encrypted at rest, such as on magnetic tapes, keys can be stored, for example, in a safe deposit box in a bank.

Another solution to key management lies in public-key cryptography, wherein encryption keys come in pairs comprising a public key and a private key. The public key, which may be distributed over unsecured channels, is usable for encrypting and verifying signatures, while only the private key, which is closely held, can decrypt information encrypted with the public key, and sign.

SUMMARY OF THE INVENTION

According to a first aspect of the present invention, there is provided an apparatus comprising a receiver configured to receive at least part of a key in scrambled form, and at least one processing core configured to descramble the at least part of the key and to apply the key in a cryptographic procedure, the descrambling being based at least in part on at least one environmental condition.

Various embodiments of the first aspect may comprise at least one feature from the following bulleted list:
- the at least one processing core is further configured to obtain, for the descrambling, information on the at least one environmental condition, the at least one environmental condition prevailing at least one of around and in the apparatus or a device housing the apparatus
- the apparatus is configured to receive the key from a first node over a wireless interface. Such a first node may comprise, for example, a low-power radio enabled node.
- the wireless interface comprises a low-power wireless interface
- the cryptographic procedure comprises one of the following: decrypting information, digitally signing information and encrypting information
- the at least one processing core is further configured to cause the apparatus to participate in a pairing of the apparatus with the first node, and wherein the at least one processing core is configured to descramble the at least part of the key based at least in part on information generated in the pairing
- the pairing is based at least in part on at least one of a touch interaction, a code input interaction and a subscription
- the receiver is configured to receive the at least part of the key from a plurality of nodes, from each of the plurality of nodes, in scrambled form, a section of the key, from the plurality of nodes collectively the entire at least part of the key.

According to a second aspect of the present invention, there is provided an apparatus, comprising a memory configured to store at least part of a key, and at least one processing core configured to scramble the at least part of the key, and cause the at least part of the key to be transmitted in scrambled form, wherein the scrambling is based at least in part on at least one environmental condition.

Various embodiments of the second aspect may comprise at least one feature from the following bulleted list:
- the at least one processing core is further configured to obtain, for the scrambling, information on the at least one environmental condition, the at least one environmental condition prevailing at least one of around and in the apparatus or a device housing the apparatus
- the at least one processing core is further configured to cause the apparatus to participate in a pairing of the apparatus with a first node, and wherein the at least one processing core is configured to scramble the key based at least in part on information generated in the pairing
- the apparatus is configured to obtain the key from the pairing.

According to a third aspect of the present invention, there is provided a method comprising receiving, in an apparatus, at least part of a key in scrambled form, descrambling the at least part of the key based at least in part on at least one environmental condition, and applying the key in a cryptographic procedure.

Various embodiments of the third aspect may comprise at least one feature corresponding to a feature comprised in the bulleted list laid out above in connection with the first aspect.

According to a fourth aspect of the present invention, there is provided a method, comprising storing, in an apparatus, at least part of a key, scrambling the at least part of the key, and causing the at least part of the key to be transmitted in scrambled form, wherein the scrambling is based at least in part on at least one environmental condition.

Various embodiments of the fourth aspect may comprise at least one feature corresponding to a feature comprised in the bulleted list laid out above in connection with the second aspect.

According to a fifth aspect of the present invention, there is provided an apparatus comprising means for receiving at least part of a key in scrambled form, means for descrambling the at least part of the key based at least in part on at least one environmental condition, and means for applying the key in a cryptographic procedure.

According to a sixth aspect of the present invention, there is provided an apparatus comprising means for storing at least part of a key, means for scrambling the at least part of the key, and means for causing the at least part of the key to be transmitted in scrambled form, wherein the scrambling is based at least in part on at least one environmental condition.

According to a seventh aspect of the present invention, there is provided a non-transitory computer readable medium having stored thereon a set of computer readable instructions that, when executed by at least one processor, cause an apparatus to at least receive at least part of a key in scrambled form, descramble the at least part of the key based at least in part on at least one environmental condition, and apply the key in a cryptographic procedure.

According to an eighth aspect of the present invention, there is provided a non-transitory computer readable medium having stored thereon a set of computer readable instructions that, when executed by at least one processor, cause an apparatus to at least store, in an apparatus, at least part of a key, scramble the at least part of the key, and cause the at least part of the key to be transmitted in scrambled form, wherein the scrambling is based at least in part on at least one environmental condition.

INDUSTRIAL APPLICABILITY

At least some embodiments of the present invention find industrial application in securing information against unauthorized access.

DETAILED DESCRIPTION OF EXAMPLE EMBODIMENTS

Storing an encryption key on another apparatus and receiving it from there in scrambled form makes obtaining confidential information by network intrusion more difficult, as the encryption key is not stored in a computer that is accessible via normal networking If the scrambling is dependent on environmental conditions, an intruder will find theft of the key difficult even by eavesdropping on a receiver of the networked computer.

Figure 1:
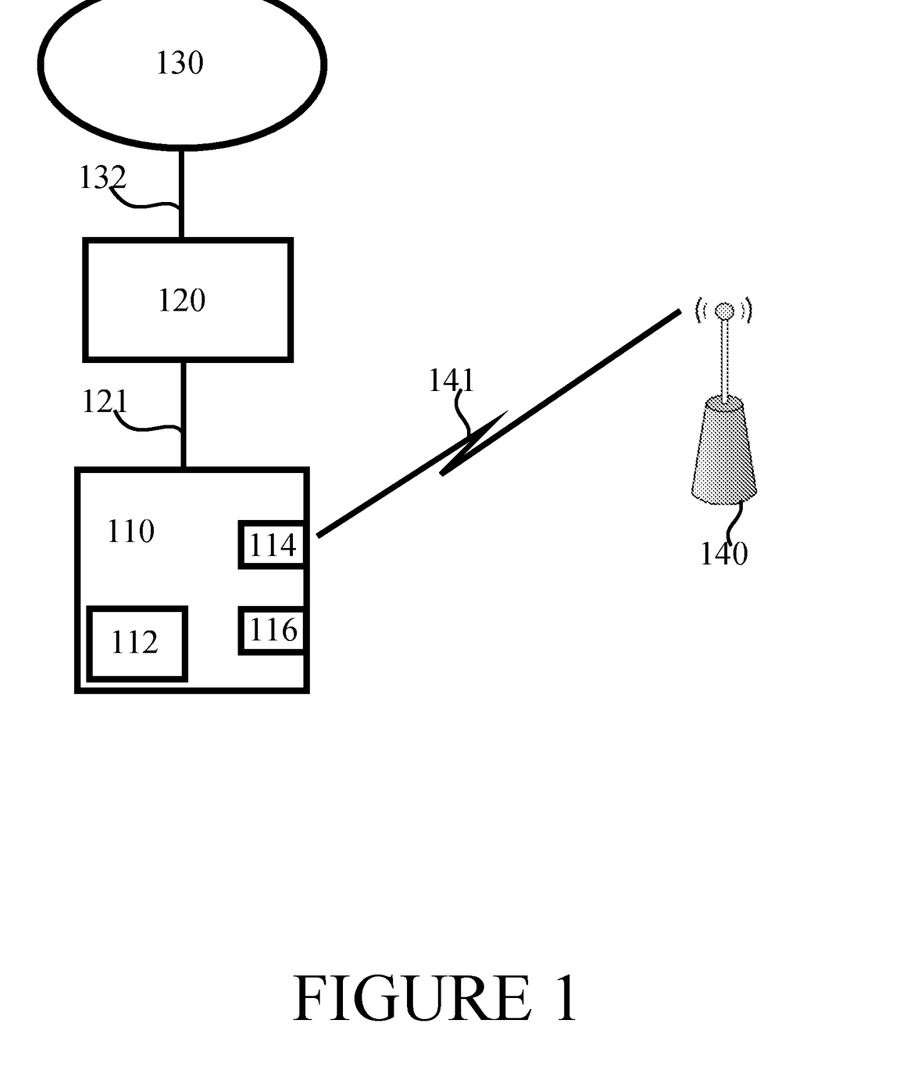
FIG. 1 illustrates a first example system capable of supporting at least some embodiments of the present invention.

FIG. 1 illustrates a first example system capable of supporting at least some embodiments of the present invention. Illustrated is device 110, which may comprise a desktop computer, laptop computer or tablet computer, for example. Device 110 comprises, or has access to, a memory 112 which is configured to store information, such as for example encrypted information. Information that is stored in encrypted form may be said to be encrypted "at rest". Whereas memory 112 is illustrated in FIG. 1 as internal to device 110, in some embodiments memory 112 may be external to device 110, for example where device 110 is a laptop computer, memory 112 may be an external hard drive operably connected to the laptop computer. Such an external connection may take the form of a universal serial bus, USB, connection, for example.

Device 110 comprises receiver 114, which may comprise a wire-line or wireless receiver. Where interface 114 is wire-line, it may comprise a serial, parallel or Ethernet interface, for example. Where receiver 114 is wireless, it may comprise a cellular or non-cellular receiver, for example. A cellular receiver may comprise a wideband code division multiple access, WCDMA, interface, or a long term evolution, LTE, receiver, for example. A non-cellular wireless receiver may comprise a wireless local area network, WLAN, receiver, for example. A WLAN receiver may also be known as a Wi-Fi receiver. A wireless receiver may comprise a low-power wireless receiver, such as, for example, a Bluetooth or Bluetooth low-energy receiver. A low-power wireless receiver may be used for communication in the vicinity of device 110, wherein a range of a low-power wireless connection over a low-power wireless receiver may have a limited range of, for example, about 10 meters. Device 110 may comprise at least one sensor 116, wherein sensor 116 may be configured to obtain information on at least one environmental condition prevailing in or around device 110. Although illustrated as being comprised in device 110, in some embodiments sensor 116 is outside of device 110, for example connected to device 110 via a cable or a wireless connection.

Device 110 may be communicatively coupled, via connection 121, to gateway 120. Such coupling may comprise a wire-line or wireless connection. Such coupling may be based, at least in part, on internet protocol, IP. Gateway 120 may comprise, for example, a WLAN modem or hub, a corporate gateway/firewall or a gateway of a cellular communication network, for example.

Gateway 120 may be communicatively coupled, via connection 132, to network 130, which may comprise an unsecure network such as, for example, the Internet or another network accessible to a large number, or unrestricted set, of persons. Gateway 120 may comprise a firewall functionality to prevent unauthorized access from network 130 to device 110. In some embodiments, gateway 120 is absent and device 110 is coupled directly to network 130.

Node 140 comprises a node external to device 110 that is communicatively connectable to device 110. In the example of FIG. 1, node 140 and device 110 are communicatively coupled via wireless link 141. Wireless link 141 may comprise a unidirectional or bi-directional link to enable communication from node 140 to device 110, or in both directions. Wireless link 141 may be based at least in part on time division multiple access, TDMA, code division multiple access, CDMA, orthogonal frequency division multiple access, OFDMA, or frequency hopping, for example. Wireless link 141 may comprise a digitally modulated wireless link. Wireless link 141 in general is capable of interoperating with receiver 114 of device 110 to transmit information from node 140 to receiver 112. Wireless link 141 may comprise a Bluetooth, Bluetooth low energy or near field communication, NFC, link, for example.

Although illustrated as a wireless link, in some embodiments node 140 and device 110 are communicatively connectable to one another using a wire-line connection instead of, or in addition to, wireless link 141. In some embodiments, node 140 is communicably coupled to device 110 via network 130. In these embodiments, device 110 need not comprise a receiver 114, since it has a transceiver comprising a receiver operable to allow communication over connection 121. In these cases, communication between device 110 and node 140 may be protected by encryption, such as for example by an encrypted tunnel between device 110 and node 140. In these cases, communication described below as taking place via link 141 may take place via network 130.

Node 140 may comprise a mobile device, for example node 140 may comprise a mobile phone, smartphone, tablet or phablet device. A user of device 110 may carry node 140 with him, so that when he uses device 110, node 140 will be in communication range of device 110. Conversely, when the user is distant from device 110 and not using device 110, node 140 may be with the user and out of communication range of device 110.

Where memory 112 stores encrypted information, the encryption key may be stored in memory 112, or another memory, of device 110. In such scenarios, in case a network intruder manages to gain access to device 110, he may be able to copy the encrypted information from memory 112, and he may be able to attempt a search for the encryption key. In case the key is stored in device 110, a risk is present that the intruder finds the key. To mitigate this risk, the key may be stored in encrypted format, wherein a user of device 110 needs to input a password to decrypt the key, before the key can be used to access the encrypted information stored in memory 112.

Alternatively to storing the key in device 110, the key may be stored at least in part in node 140. Hereinafter the key will be referred to as stored in node 140 for the sake of brevity, but it is to be understood that in some embodiments only a section of the key is stored in node 140. Where device 110 stores a first part of the key and receives a second part of the key from node 140, device 110 may join the first and second parts together to thereby obtain the entire key. In case node 140 is not connected to network 130, an intruder cannot obtain access to node 140 from network 130.

Node 140 may be configured to scramble the key, stored in node 140, and transmit the key in scrambled form to device 110. The scrambling operation may take the key as input and produce a block of information as output, the block of information constituting the scrambled key. The output may be determined by the key, the scrambling algorithm, and scrambling parameters. The scrambling algorithm may comprise, at least in part, for example, hashing, encryption, randomization or random index generation. Scrambling parameters may comprise at least one environmental condition. Choice of scrambling algorithm may depend on at least one environmental condition. In case the scrambling comprises encryption, the encryption key needed to descramble the key capable of decrypting the encrypted information in memory 112 may be derivable using, at least in part, information on the at least one environmental condition. For example, a mapping may be defined from a set of quantized environmental conditions to bit ranges in this key, so that, for example, an atmospheric pressure can determine three bits of a 128-bit key, a temperature can determine another three bits, a time may determine a further two bits, etc. The skilled person can come up with several ways to associate at least one environmental condition with an encryption key needed to descramble. Scrambling may comprise that a quantity of data is increased, such that a large number of packets are transmitted the majority of which comprise no part of the key.

Device 110, being in receipt of the scrambled key, may descramble the key to obtain an unscrambled key, which is usable for decrypting the encrypted information in memory 112. Once device 110 has used the key for decrypting, or for another cryptographic procedure, it may be deleted from device 110 so that the key is not stored in device 110, and is thus not available to a network intruder. In general, a cryptographic procedure may comprise one of the following: decrypting information, digitally signing information and encrypting information. Encrypting and/or decrypting may be performed by employing a suitable encryption algorithm, such as Blowfish or 3DES. A digital signature may be performed by employing a suitable algorithm, such as for example the Rabin algorithm or the PKCS #1 algorithm.

Environmental conditions usable as scrambling parameters comprise location, time of day, gravity, atmospheric conditions, temperature, weather, amount of sunlight, season, noise level, language spoken in the room, mood of the people in the room, dominant color in the room, deviation of magnetic north, radiation level, concentration of some other types of rays, relative position of some orbital object or a satellite, face or fingerprint recognition, other network traffic in the radio interface like WLAN, or similar local conditions available from various sensors. Location may take the form of geolocation, address, coordinates or other suitable indicators of location. Gravity may be indicated by a local acceleration caused by gravity. Atmospheric conditions usable comprise atmospheric pressure and/or moisture. Node 140 and device 110 may be furnished with sensors usable in obtaining information of environmental conditions used, for example a pressure sensor is operable to measure a pressure. The pressure reading may then be quantified, for example, to remove small differences in the measurement results between device 110 and node 140 so that both apparatuses measure the same, quantified pressure. Quantifying may be used in other environmental readings as well. Device 110 and/or node 140 may not comprise sensors for all the environmental conditions used in scrambling and descrambling in case they are able to obtain the environmental information from a network source. For example, a temperature prevailing in a city may be obtained from a website of a meteorological institute.

Using at least one environmental condition as a scrambling parameter provides the benefit that even in case a network intruder succeeds in obtaining the encrypted information and access to an interface in receiver 114 inside device 110, he still cannot obtain the key since the at least one environmental condition used in scrambling in node 140 pertains to an environment shared between device 110 and node 140, but not the environment of the intruder as, it is assumed, the intruder is geographically distant from device 110 and node 140.

An intruder that is local, that is, sharing an environment with device 110 and node 140, can obtain information of environmental condition in the environment provided that he has a sensor capable of determining the correct environmental condition or conditions. Such an intruder, in order to gain access to the key, would need to know which environmental conditions are used in the scrambling, and how. Where that information is contained in device 110 and node 140, but not communicated in the clear thereinbetween, obtaining that information may be very difficult. Also where communication on wireless link 141 is encrypted, the local intruder is thwarted in his attempt to obtain a copy of the key. The problem of knowing how the environmental information is used in the scrambling is also present in case device 110 and/or node 140 obtain at least one of the at least one environmental condition from a network source. Nodes may obtain from network sources also environmental information not used in the scrambling, to confuse the intruder.

To initialize the functioning of the example system illustrated in FIG. 1, device 110 and node 140 may be paired with each other. A pairing may comprise an exchange of information, over link 141 or via another link. A pairing may comprise establishing an agreement concerning scrambling, so that going forward node 140 can scramble a key, or part thereof, and device 110 can undo the scrambling to obtain the key, or part thereof, without needing to communicate separately concerning the scrambling method. In detail, the pairing may establish how the scrambling will be based, at least in part, on the at least one environmental condition. The pairing may comprise establishing a shared secret, so that communication over link 141 can thereafter be encrypted based at least in part on the shared secret. Establishing the shared secret may be said to initialize encryption of communication over link 141. The pairing may comprise a diffie-hellman exchange to establish the shared secret, for example. Alternatively, communication over wireless link 141 may be encrypted using public-key cryptography without a shared secret. Such encryption may also be initialized in connection with the pairing.

A pairing may comprise establishing the key for decrypting the encrypted information in memory 112. Alternatively, the key may be established in device 110 prior to the pairing, in connection with encrypting the information in memory 112. Subsequent to the pairing, the key may be stored only on node 140 and not on a file system of device 110. Device 110 may be configured to only store the key in random access memory and only for a duration needed, after which the key may be removed from the random access memory. While in device 110, the key may be stored in a memory in obfuscated form to render more difficult any theft of the key. Removing the key from random access memory may comprise overwriting the memory location that stored the key with other data. Storage of the key on a disk may be prevented, so that the key is not accidentally stored on a hard drive in a memory cache file, for example. Alternatively, storage on a disk may be allowed with the proviso that the disk location is overwritten at least once with other data once the key is no longer needed in device 110. Once device 110 no longer has the key, an intruder cannot steal it from device 110. In case device 110 subsequently needs the key, it may re-obtain it from node 140.

Node 140 may be configured to either unsolicited or upon request transmit the scrambled key. In case node 140 transmits the key upon request, device 110 may be enabled to know when node 140 is within communication range, for example based on the pairing device 110 may scan for node 140 to determine if communication with node 140 is possible.

Figure 2:
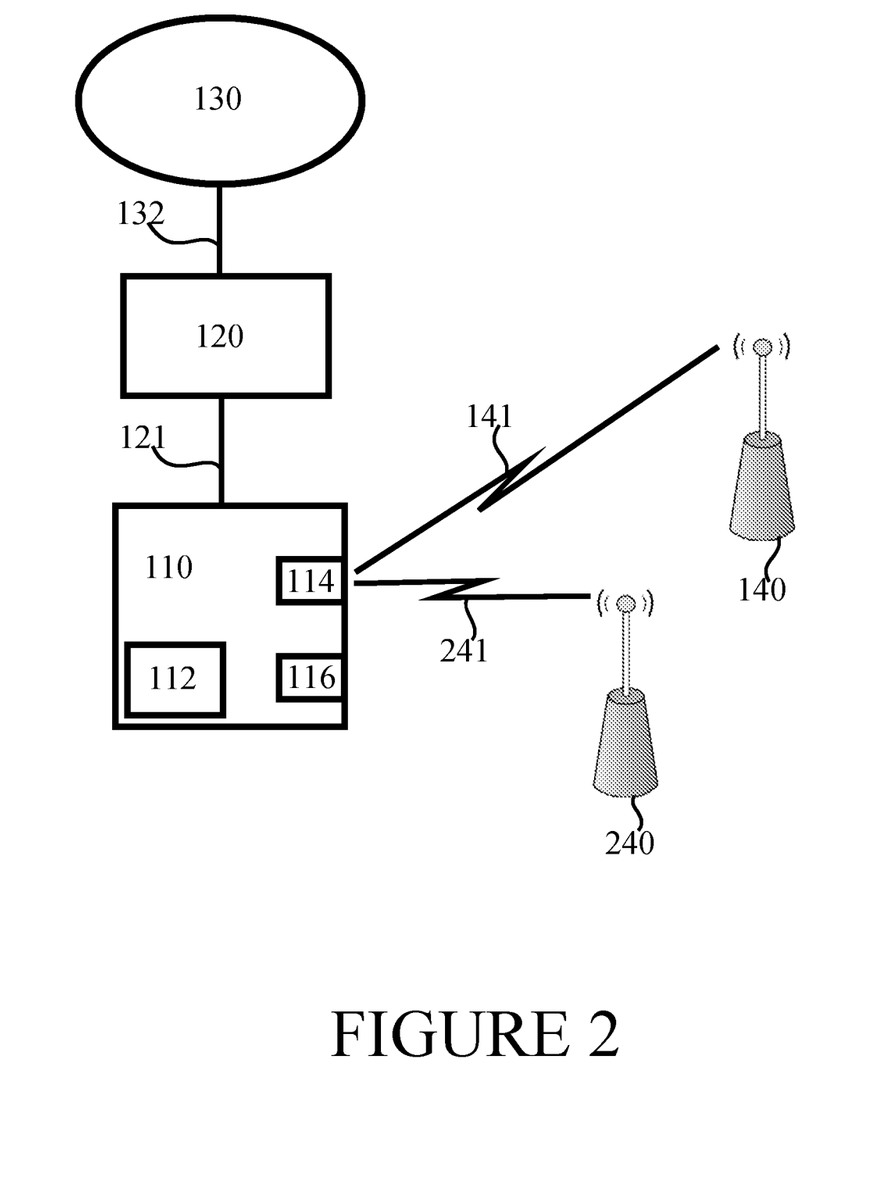
FIG. 2 illustrates a second example system capable of supporting at least some embodiments of the present invention.

FIG. 2 illustrates a second example system capable of supporting at least some embodiments of the present invention. Like reference numbers in FIG. 2 correspond to like structure in FIG. 1.

Unlike FIG. 1, in FIG. 2 there is illustrated node 240 in addition to node 140. Node 240 is communicatively coupled to device 110 via wireless link 241, which may be similar to wireless link 141 or alternatively it may be of a different type. Although illustrated as interfacing to receiver 114 in FIG. 2, wireless link 241 may interface to a different receiver of device 110 than wireless link 141. Like link 141, also link 241 is not necessarily a wireless link. In the embodiments of FIG. 2, node 140 stores a first part of the key needed to decrypt the encrypted information in memory 112, and node 240 stores a second part of that key. Like node 140 with the first part, node 240 is configured to scramble the second part of the key and transmit it to device 110, either solicited or unsolicited. The scrambling performed by node 240 may, like the scrambling performed by node 140, be based at least in part on at least one environmental condition.

In general, there may be a set comprising a plurality of nodes, such as nodes 140 and 240, which together transmit, in scrambled form, either the entire key or a section of the key not already known by device 110, to enable access to the encrypted information in memory 112 by device 110.

In some embodiments, node 140 and/or node 240 are configured to transmit their parts of the key to device 110 in scrambled form via network 130, rather than via links 141 and/or 241.

To initialize the embodiments of FIG. 2, either a three-way pairing, or in general a multi-way pairing, may take place. Alternatively, node 140 may be paired with device 110, and subsequently node 240 may be paired with either device 110 or node 140, to establish the information on scrambling and, optionally, initialize encryption of links 141 and 241.

Figure 3:
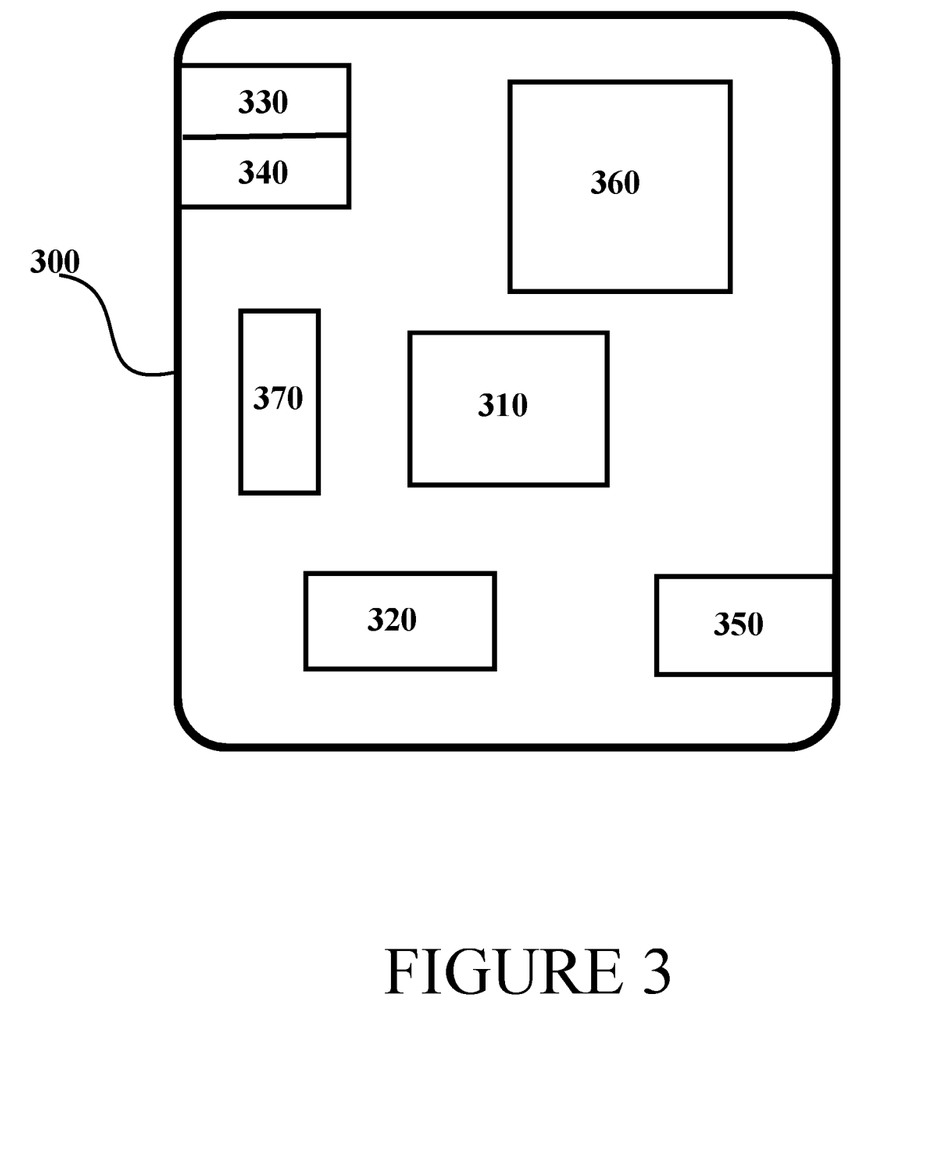
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a device such as device 110 or node 140 of FIG. 1 or FIG. 2. Comprised in device 300 is processor 310, which may comprise, for example, a single- or multi-core processor wherein a single-core processor comprises one processing core and a multi-core processor comprises more than one processing core. Processor 310 may comprise a Qualcomm Snapdragon 800 processor, for example. Processor 310 may comprise more than one processor. A processing core may comprise, for example, a Cortex-A8 processing core manufactured by Intel Corporation or a Brisbane processing core produced by Advanced Micro Devices Corporation. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
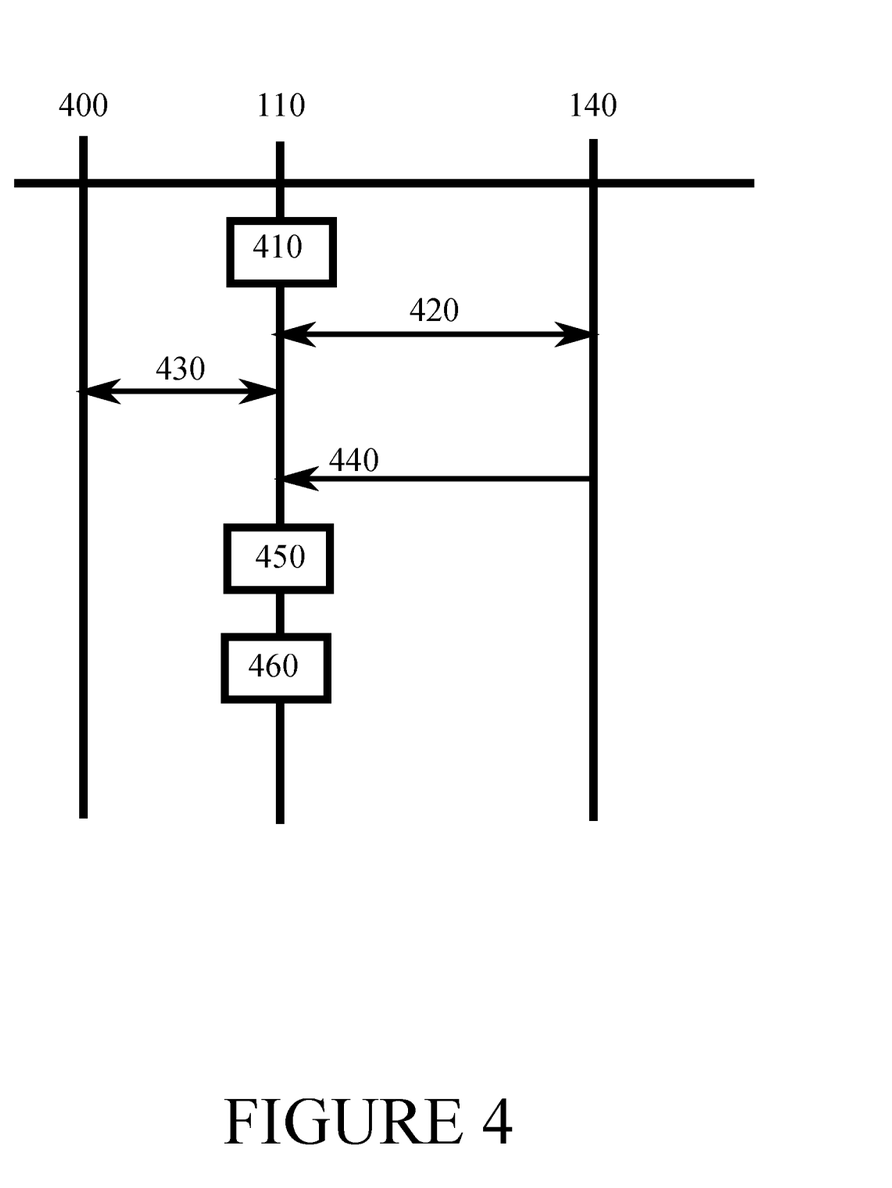
FIG. 4 illustrated signalling in accordance with at least some embodiments of the present invention.

FIG. 4 illustrated signalling in accordance with at least some embodiments of the present invention. On the vertical axes are disposed, from left to right, intruder 400, device 110 and node 140. Device 110 and node 140 may correspond to like entities in FIG. 1 and FIG. 2. Time advances from top to bottom.

In phase 410, device 110 may encrypt information and store the encrypted information, for example in memory 112 of FIG. 1 and FIG. 2. A key may be generated in connection with the encrypting, the key being enabled to decrypt the encrypted information.

In phase 420, device 110 and node 140 are paired. In connection with the pairing, the key is provided to node 140 and deleted from device 110. The pairing may also comprise initializing scrambling between device 110 and node 140, wherein such initialization may comprise agreement concerning at least one environmental condition that is to be used in the scrambling.

In phase 430, intruder 400 gains illicit access to device 110, for example from network 130. Intruder 400 may gain access by exploiting a vulnerability in software installed in device 110, for example. However, since the key is not stored on device 110, the intruder does not obtain access to the contents of the encrypted information since that information is encrypted at rest in device 110, and the key is not available in device 110.

In phase 440, node 140 transmits to device 110 the key in scrambled form, the scrambling being at least in part based on at least one environmental condition prevailing in or around node 140 and device 110.

In phase 450, being in receipt of the scrambled key, device 110 descrambles the key, or part of the key, to thereby obtain the entire key in descrambled form.

Subsequently, in phase 460, device 110 employs the descrambled key to obtain access to the contents of the encrypted information in memory 112. Once the access is finished, the information may once more be encrypted, for example using the key, and the key may be again deleted from device 110. While in device 110, the key may be stored in a memory in obfuscated form to render more difficult any theft of the key.

Figure 5:
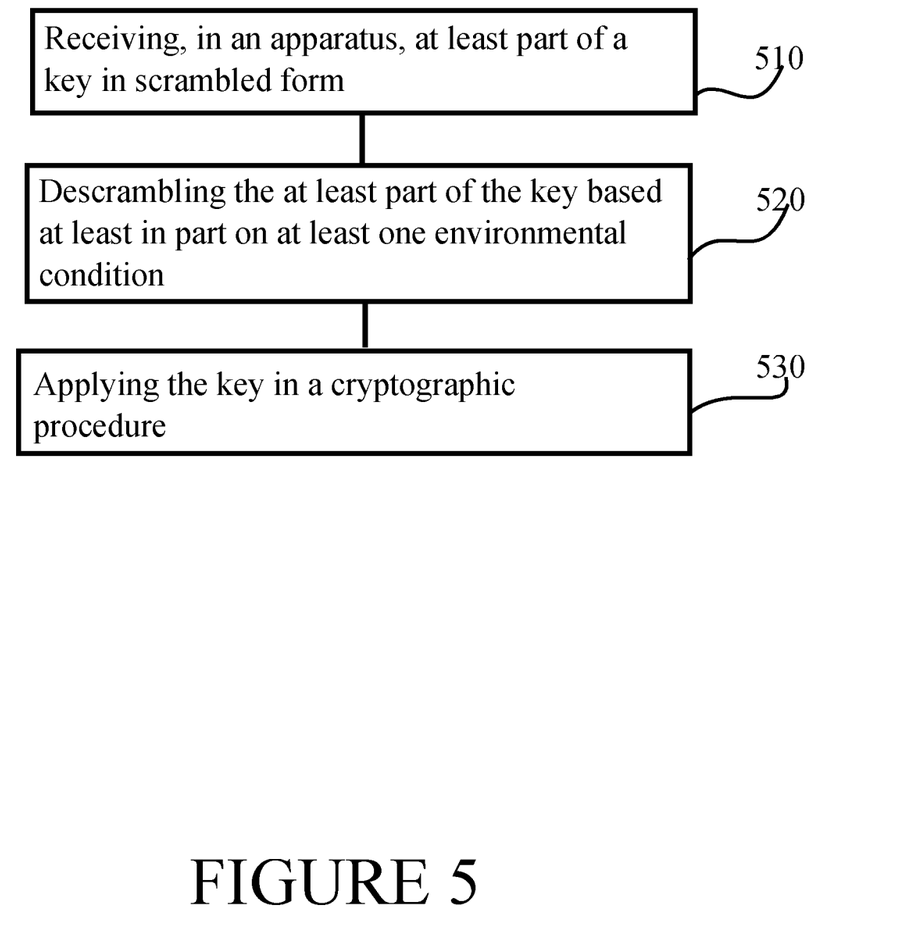
FIG. 5 is a first flow chart of a first method in accordance with at least some embodiments of the present invention.

FIG. 5 is a first flow chart of a first method in accordance with at least some embodiments of the present invention. The phases of the illustrated method may be performed in device 110, for example, or in a control device, such as a chipset or processor, configured to control the functioning of device 110 when implanted therein. Phase 510 comprises receiving, in an apparatus, at least part of a key in scrambled form. Phase 520 comprises descrambling the at least part of the key based at least in part on at least one environmental condition. Finally, phase 530 comprises applying the key in a cryptographic procedure. Examples of scrambling and cryptographic procedures have been described above.

Figure 6:
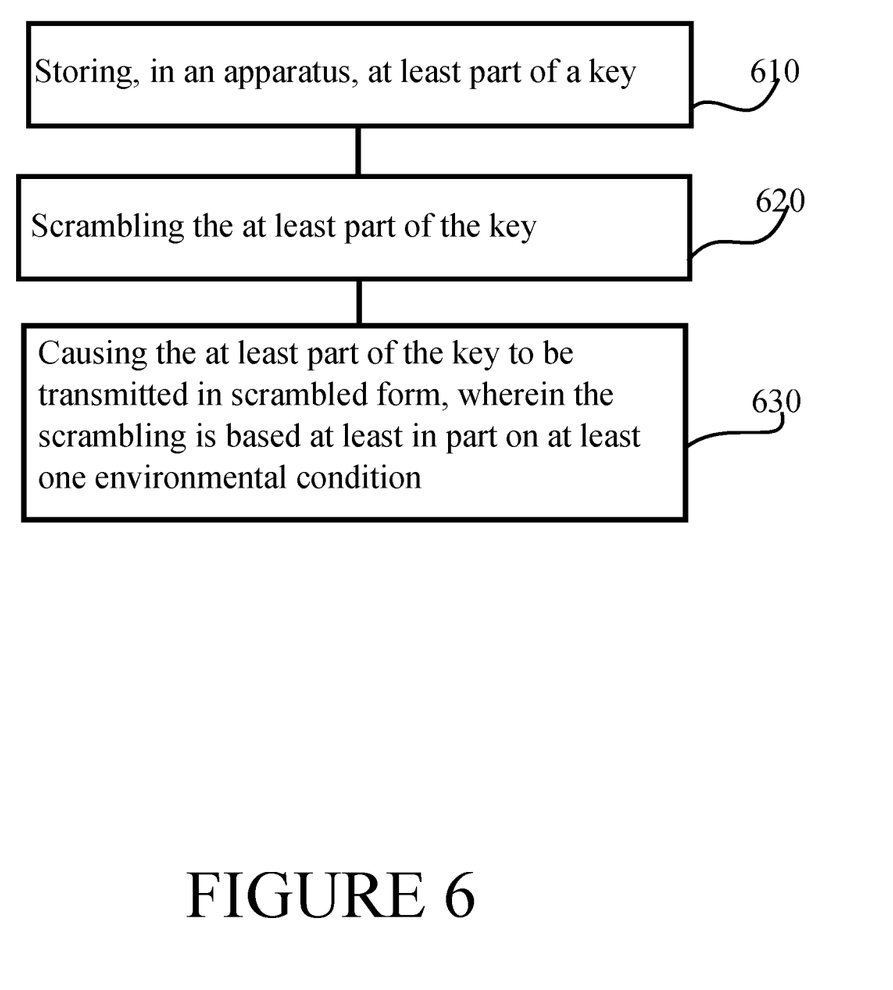
FIG. 6 is a second flow chart of a second method in accordance with at least some embodiments of the present invention.

FIG. 6 is a second flow chart of a second method in accordance with at least some embodiments of the present invention. The phases of the illustrated method may be performed in node 140, for example, or in a control device, such as a chipset or processor, configured to control the functioning of node 140 when implanted therein. Phase 610 comprises storing, in an apparatus, at least part of a key. Phase 620 comprises scrambling the at least part of the key. Finally, phase 630 comprises causing the at least part of the key to be transmitted in scrambled form, wherein the scrambling is based at least in part on at least one environmental condition.

In general there is provided a first apparatus comprising a receiver configured to receive at least part of a key in scrambled form, and at least one processing core configured to descramble the at least part of the key and to apply the key in a cryptographic procedure, the descrambling being based at least in part on at least one environmental condition. The first apparatus may comprise device 110, or a control device, such as processor or chipset, for inclusion in device 110 to control the functioning thereof The receiver may receive the key via a wireless interface. A wireless interface may comprise a low-power wireless interface.

In some embodiments, the at least one processing core is further configured to obtain, for the descrambling, information on the at least one environmental condition, the at least one environmental condition prevailing at least one of around and in the apparatus or a device housing the first apparatus. Environmental conditions may comprise, as described above, temperature, pressure, or other conditions. Information on environmental conditions may be obtained via a suitable sensor, for example. Where the at least one environmental condition prevails in or around a device housing the first apparatus, such device may comprise device 110 and the first apparatus may comprise a control device arranged, or enabled to be arranged, therein.

The at least one processing core may further be configured to cause the apparatus to participate in a pairing of the apparatus with the first node, and wherein the at least one processing core is configured to descramble the at least part of the key based at least in part on information generated in the pairing. The pairing may comprise a Bluetooth pairing procedure, or another kind of pairing procedure, for example.

A pairing may be based at least in part on at least one of a touch interaction, a code input interaction and a subscription. A touch interaction may comprise the first node, which may correspond to node 140, for example, touching a part of device 110. A code input interaction may comprise that a first one of device 110 and node 140 displays a code, which a user then inputs into a second one of device 110 and node 140. A pairing may comprise that device are connected by a cable, such as for example a USB cable. A pairing may be configured in devices as a factory preset in which case a user may not need to perform actions to cause the pairing to occur.

The receiver may be configured to receive the at least part of the key from a plurality of nodes, from each of the plurality of nodes, in scrambled form, a section of the key, from the plurality of nodes collectively the entire at least part of the key. In other words, the first apparatus may be enabled to receive the key, or the part of the key the first apparatus does not already have, from a plurality of nodes, each of the plurality of nodes providing a section of the key. The key may be provided thus in scrambled form.

In general there is provided a second apparatus, comprising a memory configured to store at least part of a key, and at least one processing core configured to scramble the at least part of the key, and cause the at least part of the key to be transmitted in scrambled form, wherein the scrambling is based at least in part on at least one environmental condition. The memory may comprise RAM or magnetic memory, for example.

The at least one processing core of the second apparatus may be further configured to obtain, for the scrambling, information on the at least one environmental condition, the at least one environmental condition prevailing at least one of around and in the apparatus. Information on environmental conditions may be obtained via a suitable sensor, for example.

The at least one processing core of the second apparatus may further be configured to cause the apparatus to participate in a pairing of the apparatus with a first node, and wherein the at least one processing core is configured to scramble the key based at least in part on information generated in the pairing. The pairing may comprise a Bluetooth or another kind of pairing.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising:
   a receiver configured to receive at least part of a key generated by the apparatus in scrambled form from at least one node, and
   at least one processing core configured to descramble the at least part of the key and to apply the key in a cryptographic procedure, the descrambling being based at least in part on at least one environmental condition shared by the apparatus and the at least one node, wherein
   the at least one processing core is further configured to obtain, for the descrambling, information on the at least one environmental condition, the at least one environmental condition prevailing at least one of around and in the apparatus or a device housing the apparatus.

2. The apparatus according to claim 1, wherein the apparatus is configured to receive the key from a first node over a wireless interface.

3. The apparatus according to claim 2, wherein the wireless interface comprises a low-power wireless interface.

4. The apparatus according to claim 1, wherein the cryptographic procedure comprises one of the following: decrypting information, digitally signing information and encrypting information.

5. The apparatus according to claim 2, wherein the at least one processing core is further configured to cause the apparatus to participate in a pairing of the apparatus with the first node, and wherein the at least one processing core is configured to descramble the at least part of the key based at least in part on information generated in the pairing.

6. The apparatus according to claim 5, wherein the pairing is based at least in part on at least one of a touch interaction, a code input interaction and a subscription.

7. The apparatus according to claim 1, wherein the receiver is configured to receive part of the key from a plurality of nodes, from each of the plurality of nodes, in scrambled form, a section of the key, from the plurality of nodes collectively the entire key.

8. An apparatus, comprising:
   a memory configured to store at least part of a key generated by a user equipment, and
   at least one processing core configured to scramble the at least part of the key, and cause the at least part of the key to be transmitted in scrambled form to the user equipment, wherein the scrambling is based at least in part on at least one environmental condition shared by the user equipment and the apparatus, wherein
   the at least one processing core is further configured to obtain, for the scrambling, information on the at least one environmental condition, the at least one environmental condition prevailing at least one of around and in the apparatus or a device housing the apparatus.

9. The apparatus according to claim 8, wherein the at least one processing core is further configured to cause the apparatus to participate in a pairing of the apparatus with a first node, and wherein the at least one processing core is configured to scramble the key based at least in part on information generated in the pairing.

10. The apparatus according to claim 9, wherein the apparatus is configured to obtain the key from the pairing.

11. A method comprising:
    receiving, in an apparatus, at least part of a key generated by the apparatus in scrambled form from at least one node;
    descrambling the at least part of the key based at least in part on at least one environmental condition shared by the apparatus and the at least one node;
    obtaining, for the descrambling, information on the at least one environmental condition, the at least one environmental condition prevailing at least one of around and in the apparatus; and
    applying the key in a cryptographic procedure.

12. The method according to claim 11, wherein the at least part of the key is received from a first node over a wireless interface.

13. The method according to claim 12, wherein the wireless interface comprises a low-power wireless interface.

14. The method according to claim 11, wherein the cryptographic procedure comprises one of the following: decrypting information, digitally signing information and encrypting information.

15. The method according to claim 12, further comprising causing the apparatus to participate in a pairing of the apparatus with the first node, and wherein the at least part of the key is descrambled based at least in part on information generated in the pairing.

16. The method according to claim 15, wherein the pairing is based at least in part on at least one of a touch interaction, a code input interaction and a subscription.

17. The method according to claim 11, wherein the receiving comprises receiving part of the key from a plurality of nodes, from each of the plurality of nodes, in scrambled form, a section of the key, from the plurality of nodes collectively the entire key.

* * * * *